United States Patent
Haker et al.

[15] 3,693,838
[45] Sept. 26, 1972

[54] MATERIAL APPLICATION RATE INDICATOR

[72] Inventors: Edwin J. Haker, Elm Grove; Norman L. Peterson, Wauwatosa, both of Wis.

[73] Assignee: Rex Chainbelt Inc., Milwaukee, Wis.

[22] Filed: March 12, 1970

[21] Appl. No.: 18,845

[52] U.S. Cl. ............................... 222/178, 239/155
[51] Int. Cl. ........................................ A01c 15/00
[58] Field of Search ............... 222/178, 52; 239/155

[56] References Cited

UNITED STATES PATENTS

| | | | |
|---|---|---|---|
| 3,511,411 | 5/1970 | Weiss | 222/178 X |
| 3,233,832 | 2/1966 | Hallberg | 239/155 |
| 3,330,443 | 7/1967 | Etnyre | 239/155 X |

*Primary Examiner*—Samuel F. Coleman
*Attorney*—Sughrue et al.

[57] ABSTRACT

A mobile processing machine that processes and adds a liquid to the material over which it travels is provided with a pair of pulse type electrical tachometers, one driven by a liquid flow meter and the other by a machine part that rotates in proportion to the travel of the machine. The outputs of the tachometers are differentially applied to a milliameter, a contact making milliameter or a sensitive polarized relay which indicates the departure from the selected flow rate or which, through suitable solenoid operated valves controls the flow of the liquid to maintain a selected flow rate with respect to machine speed or to maintain a selected machine speed relative to flow rate.

4 Claims, 3 Drawing Figures

PATENTED SEP 26 1972 3,693,838

3,693,838

MATERIAL APPLICATION RATE INDICATOR

BACKGROUND OF THE INVENTION

Various types of processing machinery are arranged to travel over a surface to be treated or processed and to apply a processing liquid to the surface or surface material as it is being processed. One such machine is a tractor equipped with a pulverizer for use in road building. The pulverizer is sometimes fed with a liquid, such as an asphaltic binder, that is sprayed onto the material as it is being pulverized and is thus thoroughly mixed and evenly distributed throughout the pulverized bed of material.

While asphalt spreaders have been equipped with metering controls, such as the spreader and control shown in U.S. Pat. No. 3,356,261 to Stein, the controls have either been difficult to adjust, expensive, or difficult to maintain operation in an adverse environment.

SUMMARY OF THE INVENTION

According to the invention a hydraulic meter that continuously measures the flow of liquid being pumped to a pulverizer mixer, and the vehicle carrying the pulverizer-mixer are each equipped with electrical tachometers. The tachometers are differentially connected by electrical circuits with a current measuring device. Adjusting means in or associated with the circuits allow the circuits to be readily adjusted to give a zero current reading when a predetermined rate of flow of liquid with respect to vehicle velocity is attained. The electrical current measuring device may include circuit closing means connected through suitable solenoid valves and hydraulic controls to regulate the flow of liquid or the machine speed.

The principal object of this invention is to provide an inexpensive, rugged, readily adjustable indicator and control for indicating the departure of the rate of flow of liquid material to a processing device from a desired rate that corresponds to the speed of the device and, with additional control, to maintain the rate of flow of the liquid being supplied to the moving processing device proportional to the speed of the device.

Another object is to provide a rugged electrical differential tachometer for use with a positive displacement meter and a member that rotates in accordance with the travel of a vehicle.

Another object is to provide an inexpensive, readily adjustable control for indicating and regulating the velocity of the flow of liquid material into a pulverizer according to the velocity of the pulverizer.

These and more specific objects and advantages are obtained in a preferred form of the invention as illustrated in the accompanying drawings.

DESCRIPTION OF THE PREFERRED EMBODIMENTS

Figure 1:
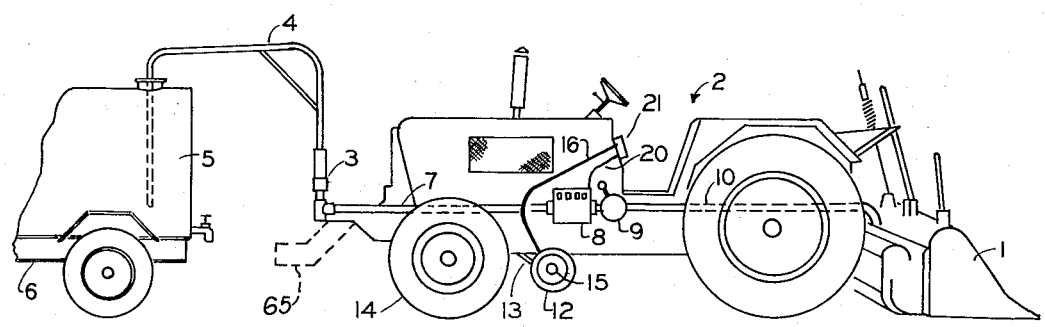
FIG. 1 is a side view of a tractor and pulverizer, and a portion of a supply vehicle, that employs a control according to the invention.

As an example of equipment employing the invention, a pulverizer 1 is shown attached to the rear of a tractor 2 in a conventional manner and driven from a power take-off not shown, of the tractor, The pulverizer 1, according to common practice, is equipped with rotating blades or tines that are rotated at a fairly rapid speed by the tractor take-off drive so as to completely break up or pulverize the material over which the tractor is operating.

The tractor also carries and drives a centrifugal pump 3. If desired a separate engine may be supplied to drive the pump so that the pumping speed does not vary with changes in speed of the tractor engine itself. The pump 3 is arranged to draw liquid through an inlet pipe 4 from a supply tank 5 carried on a truck 6. The liquid discharged from the pump 3 is fed through a pipe 7, a positive displacement fluid meter 8, a control valve 9 and a pipe 10 leading to spray nozzles, not shown, included in the housing of the pulverizer 1.

A small wheel 12 mounted on a movable downwardly directed bracket 13 is arranged so that it can be raised or lowered and, when lowered, preferably runs in the track of a front wheel 14 of the tractor. The small wheel 12 is connected to and drives a cam and breaker point assembly 15 (see FIG. 2) arranged to briefly close a circuit through a cable 16 several times per revolution of the wheel, for example, five make and breaks per revolution of the wheel 12. While a separate wheel on a separate bracket has been shown, the cam and breaker arrangement may also be operated directly from one of the ground engaging wheels of the tractor, preferably a wheel other than a drive wheel, which may slip under some conditions.

The liquid flow meter 8 also includes a shaft that carries a cam 18 cooperating with a breaker point 19 (FIG. 2) that periodically interrupts current flow through a cable 20.

The cables 16 and 20 are connected into an indicating meter box 21 mounted in a position convenient to the operator. The meter box 21 includes the tachometer circuits that are responsive to the current pulses received through the cables 16 and 20. An indicator, indicating the difference between the repetition rates of these pulses, which corresponds to the fluid flow through the meter 8 and the speed of the tractor 2, provides the tractor operator a continuous indication of whether or not sufficient liquid is being sprayed into the pulverizer 1.

Figure 2:
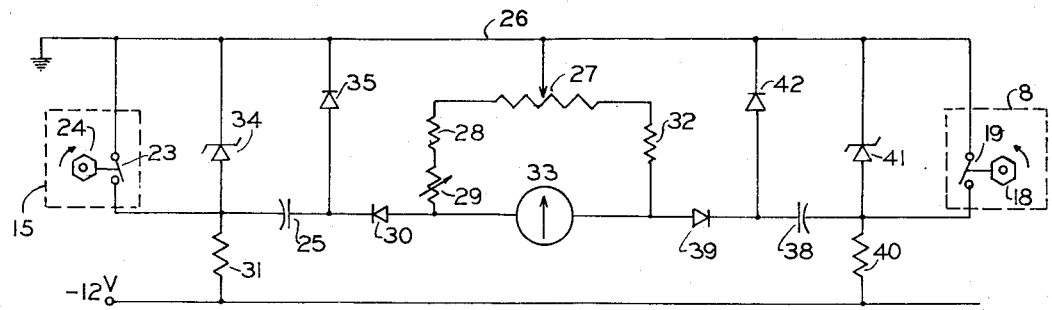
FIG. 2 is a schematic wiring diagram of the tachometer circuits employed in the indicator or control.

The tachometer circuits are illustrated in detail in FIG. 2. These circuits include a set of breaker points 23 operated by the cam 24 of the cam and breaker assembly 15 as well as the cam 18 and breaker point 19 operated by the meter 8.

The tachometer circuit cooperating with the breaker points 23 is arranged when the breaker points 23 are open to charge a condenser 25 from the ground line 26 by way of a balance control potentiometer 27, a fixed resistor 28, an adjustable resistor 29, a diode 30, the condenser 25, and a resistor 31 leading back to a negative 12 volt power lead. A portion of this circuit is paralleled by a part of the balance control potentiometer 27, a fixed resistor 32 and a coil of an indicating meter 33 such that the meter carries an adjustable portion of the charging current. The maximum voltage to which the condenser 25 can be charged through this circuit is limited by a zener diode 34 which passes current directly to the resistor 31 from the grounded supply line 26 as soon as the condenser voltage reaches the breakdown voltage of the zener diode.

As a result of this charging current, the condenser 25 acquires a charge with the terminal next to the resistor 31 negative in respect to the other terminal by approximately 7 volts, the breakdown voltage of the particular zener diode 34 employed.

As soon as the breaker points 23 close, the junction between the condenser 25 and the resistor 31 is connected directly to the ground line 26. This raises the potential of the end of the resistor 31 so that the condenser 25 then discharges through a diode 35, the return ground line 36 and the now closed breaker points 23. This discharging of the condenser does not affect the current to the meter 33 because of the blocking effect of the diode 30. Thus the meter 33 receives a current from each pulse, corresponding to each time the breaker points 23 open, and since it responds to current flow rather than charge the indication of the meter 33 is proportional to the frequency with which the breaker points 23 are operated.

In like manner, each time the breaker points 19, operated by the cam 18 of the fluid meter 8, open a condenser 38 is charged by current flow from the line 26 through the right half of the balance control potentiometer 27, the resistor 32, a diode 39, and a resistor 40 leading to the negative power lead. The portion of the circuit including the part of the balance control potentiometer 27 and the resistor 32 is paralleled by the other part of the balance control potentiometer, the resistor 28, the adjustable resistor 29 and the coil of the meter 33 so that a predetermined fraction of the charging current for the condenser 38 flows through the meter 33.

The maximum voltage to which the condenser 38 can be charged is limited by the breakdown voltage of a zener diode 41 arranged to pass current from the lead 26 to the resistor 40 whenever the voltage on the condenser 38 reaches the breakdown voltage of the zener diode.

The condenser 38 is discharged through a diode 42 and the breaker point 19 whenever the breaker point closes during the rotation of the cam 18.

Since the charging current for the condenser 38 flows through the meter in a reverse direction from the charging current for the condenser 25 the one current subtracts from the other and the meter 33 indicates the difference between the two currents. Thus the meter may be said to be differentially connected in the tachometer circuits.

Preferably the apparatus is designed, including the cams 18 and 24, so that in normal operation at least five pulses or operations of each of the breaker points occur during each second of time in order to minimize vibration of the indicator of the meter 33. Furthermore the values of the resistors 28, 29 and 32 are selected in general according to the particular installation so that generally equal currents flow when the apparatus is spraying the proper amount of material into the pulverizer.

In a practical application the fluid meter 8 is arranged so that it delivers approximately 0.2 gallon of material per operation of the breaker points 19. Similarly the small wheel 12 and the cam driven thereby are designed to provide approximately five operations of the breaker points 23 for each foot of travel of the vehicle.

While cam operator breaker point and the capacitor charging and discharging circuit has been shown as the preferred form of tachometer, other types of tachometers may be used. For example, these may include a direct current generator type in which the output voltage is directly proportional to the speed. However, for this application the capacitor discharge type of tachometer is preferable because of the relatively limited travel speed range of pulverizer 1 and because of the adverse environment in which the equipment must operate. In particular, as long as the breaker points open and close periodically, the indication is correct since all of the actual metering is done in the control circuit itself independently of the breaker points. The sensitive elements, such as the balance control potentiometer 27, the zener diodes and the meter are housed in a meter box such as the box 21 where they are completely shielded from the environment.

In some cases it may be desirable to arrange the apparatus to automatically adjust the flow of liquid according to the speed of the vehicle. This is particularly desirable when a centrifugal pump is used to move the liquid because its delivery rate varies in a non-linear manner with respect to the speed of the pump. Even if a constant speed engine is used for the centrifugal pump the control is still required if the tractor speed varies appreciably during the operation. Accordingly, an automatic control may be provided in which a valve 45, corresponding to the control valve 9, is included in the outlet pipe 10 of the fluid delivery system. The valve 45 is actuated by a hydraulic power cylinder 46 having a piston 47 connected through a connecting rod or piston rod 48 to a control arm of the valve 45. The power cylinder 46 is supplied with hydraulic fluid through an inlet pipe 50 and a four-way solenoid valve 51. From the four-way valve, pressure fluid may flow through either of two pipes 52 and 53 connecting the four-way valve 51 to the power cylinder 46. Throttling valves 54 and 55 may be used to adjust the speed of response of the power cylinder 46 with respect to actuations of the four-way valve 51. Furthermore a check valve 56 may by used so that the speed of operation is different in the two directions of motion.

The four-way valve 51 includes and is operated by solenoids 60 and 61 which in turn are controlled through contacts of a contact making milliameter 62 that is connected differentially into the tachometer circuit, either with or instead of the meter 33. A generous dead zone is provided by allowing ample space between the contacts in the meter 62 so that no difficulty is experienced from over-shooting or hunting of the control system. Also, the four-way valve 51 as shown in neutral position connects both ends of cylinder 46 with inlet pipe 50. Because of the displacement of piston rod 48, the valve 45 is biased in one direction and will close in the event of a loss of signal from the contact milliameter 62. Other arguments are, of course, also suitable with or without such biasing.

While the contact making milliameter 62 is shown as having metallic contacts, it may be desirable, in a practical operation, to employ any of the photoelectrically controlled arrangements in which the meter pointer carries a mask to interrupt the light path from a light source to a photocell which, in turn through semiconductors, controls the current flow to the solenoid 60 or 61.

Alternatively, where a separate engine drives pump 3, pipe 63 may be the intake manifold of this separate engine and valve 45 may be the carburetor control or the like to regulate automatically the speed of this separate engine.

As another embodiment of the invention, tractor 2 is provided with the forward frame extension 65 shown in broken lines in FIG. 1 and in operation with truck 6, the tractor pushes truck 6 while drawing liquid from tank 5. In this embodiment, and with reference to FIG. 2, the operator may regulate the speed of the tractor and truck 6 according to the indication of meter 8. Similarly, and with reference to FIG. 3, the pipe 63 may be the intake manifold of the engine of tractor 2 and valve 45 may be the carburetor control or the like to regulate automatically the speed of tractor 2.

The particular circuits may be readily adjusted for any desired flow rate of material, are simple and inexpensive and are insensitive to their environment.

Figure 3:
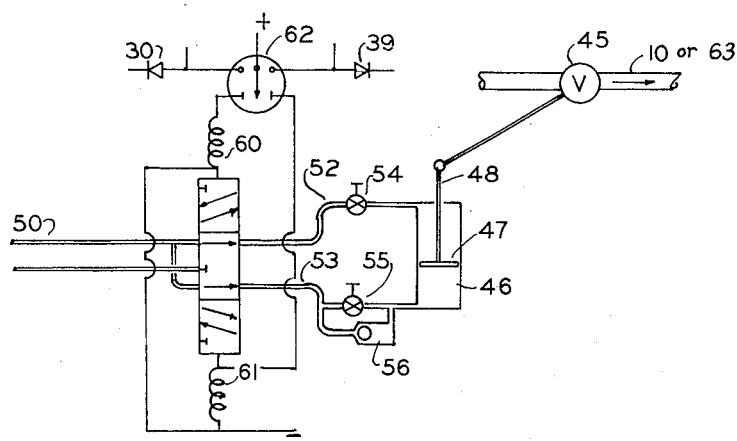
FIG. 3 is a schematic diagram of circuits, partially electric and partially hydraulic, showing an automatic control responsive to the tachometer indicating means for regulating the flow of material or the processing operation with respect to the other.

If desired, the systems of FIGS. 1 and 3 may be paralleled so that pipe 10 is controlled by both valve 9 and valve 45 and the circuits of FIGS. 2 and 3 may be combined, for example, with meters 33 and 62 connected in parallel between diodes 30 and 39 or combined in a single unit.

The combined valves and circuits provide alternatively for manual operation or an automatic adjustment of the flow. The combined circuits also allow the machine operator to monitor the automatic adjustments including by observation of the positioning and movements of piston rod 48 or the control arm of valve 45. For that purpose, a linear scale, not shown, with the graduated positions of valve 45 may be placed so that the operator is provided with a convenient approximate reference indicating the degree to which the valve 45 is open or closed at any moment.

The two circuits of FIGS. 2 and 3 are particularly adapted to be utilized when the machine approaches the end of a "run" which later is to be continued.

If the interruption is short, as to allow pipe 4 to be withdrawn from tank 5 of truck 6 when empty and another truck with a full supply to be provided, the entire electrical system may remain operative. At a selected point the liquid flow is shut off with valve 9 and the pulverizer 1 is operated some short distance beyond that point. Simultaneously with closing valve 9, or shortly before closing valve 9, valve 54 is closed so that valve 45 is, in effect, locked in position.

While machine 2 is moving and the pulverizer 1 is operating, the pulverizer is next raised and the machine 2 may then be reversed or may be driven from the site.

Wheel 12, of course, must be raised before the machine is to be maneuvered or reversed. It should be noted that with the wheel 12 raised, the electrical circuit allows valve 51 to move to its central position where the valve allows the fluid to move piston 47 and valve 45 toward the closed position, excepting that valve 54 is already closed. Preparatory to resuming operation after the short interruption, machine 2 is repositioned so that its initial operation will be to allow the machine to accelerate to normal working speed while reworking the last segment of the last prior run. No liquid is added to this segment but wheel 12 may be lowered.

The normal speed of the machine may be estimated or indicated by the engine tachometer with which the machine is normally provided and at the exact point where the liquid supply had been shut off, valve 9 is now reopened and the liquid is temporarily supplied immediately at the rate determined by the locked setting of valve 45. This assures a nearly exact continuity of the worked soil with the preselected proportions of the liquid. Thereafter the control system is put into automatic operation by reopening valve 54 to its prior setting.

If desired, a separate valve, not shown, may be used for the complete closing of line 52 so that the setting of valve 54 need not be disturbed.

If the interruption is to be extended and the liquid lines are possibly to be flushed out, the procedure does not include locking valve 45 in position prior to shut down. In that case, only valve 9 is closed at the selected point, as described, and it is necessary for the operator at that moment, or before, to note the position of valve 45, as has been mentioned. The short continued run of the machine with wheel 12 down and valve 9 closed will cause valve 45 to move to its fully open position. When the hydraulic pressure in line 50 is shut down, valve 45 may remain open.

At some time before restarting, the hydraulic lines 52 and 53 are again pressurized and will first cause valve 45 to close because of the difference in the displacements of the cylinder 46 due to the piston rod 48. This valve movement must be observed and when the valve 45 is at the position previously noted, valve 54 is closed and the machine is ready to restart work as described and after wheel 12 is lowered. At the exact point where the liquid supply has been shut off, valve 9 is now reopened and the liquid is applied at the preset rate at which the valve 45 is locked.

Thereafter, the automatic control is put into operation by reopening valve 54 to its prior setting and which allows valve 51 to function as described.

What we claim is:

1. A device for indicating the balance between the rate of flow with respect to time at which liquid material is delivered by a moving vehicle and the speed at which the vehicle travels, comprising, in combination, a liquid flow meter, first electrical means operatively connected to the meter for delivering an electrical signal proportional to the rate of flow of the liquid through said meter, second electrical means attached to the moving vehicle for delivering an electrical signal proportional to the speed of the vehicle, and electrical current indicating means differentially connected to the outputs of said first and second electrical means for indicating the ratio of the magnitudes of said electrical signals, said first and/or second electrical means further comprising capacitors that are charged to a given voltage and discharged by circuit breakers at rates which correspond respectively with the flow rate of the liquid and the speed of the moving vehicle.

2. In combination with an engine-driven tractor and a soil pulverizer-mixer carried and driven by the tractor and including engine-driven liquid supply means for applying a liquid to the soil at a selected rate respecting the rate of travel of the tractor, first electrical means including a liquid flow meter for delivering a signal proportional to the actual rate of liquid supply and second electrical means delivering a signal proportional to the speed of the tractor, a manually adjustable current responsive means having inputs differentially connected to the outputs of said first and second electrical means and having an output which varies according to the adjusted difference between the ratios of said input signals, and a powered actuator connected to the output of said current responsive means and to the engine driving said tractor or said liquid supply means for automatically maintaining the application of the liquid to the soil at a constant amount per area of the mixed soil, said first and/or second electrical means further comprising capacitors that are charged to a given voltage and discharged by circuit breakers at rates which correspond respectively with the liquid flow rate and the speed of the tractor.

3. In combination with an engine-driven tractor and a soil pulverizer-mixer carried and driven by the tractor and including engine-driven liquid supply means for applying a liquid to the soil at a selected rate respecting the rate of travel of the tractor, first electrical means including a liquid flow meter for delivering a signal proportional to the actual rate of liquid supply and second electrical means delivering a signal proportional to the speed of the tractor, a manually adjustable current responsive means having inputs differentially connected to the outputs of said first and second electrical means and having an output which varies according to the adjusted difference between the ratios of said input signals, and a powered actuator connected to the output of said current responsive means and to the engine driving said tractor or said liquid supply means for automatically maintaining the application of the liquid to the soil at a constant amount per area of the mixed soil, the liquid supply means further comprising a power-operated control valve operated by said power actuator, and a shut-off valve; the combination further comprising manually operable means for temporarily locking the control valve at a preselected setting, whereby opening the shut-off valve then provides an immediate delivery of the liquid at the preselected rate.

4. The combination of claim 3 which includes means for releasing the control valve from its locked setting whereby the current responsive means becomes operable for maintaining the application of the liquid.

\* \* \* \* \*